A. P. TANBERG.
METHOD OF MANUFACTURING DIPHENYLAMINE.
APPLICATION FILED MAY 31, 1917.
1,422,494.
Patented July 11, 1922.
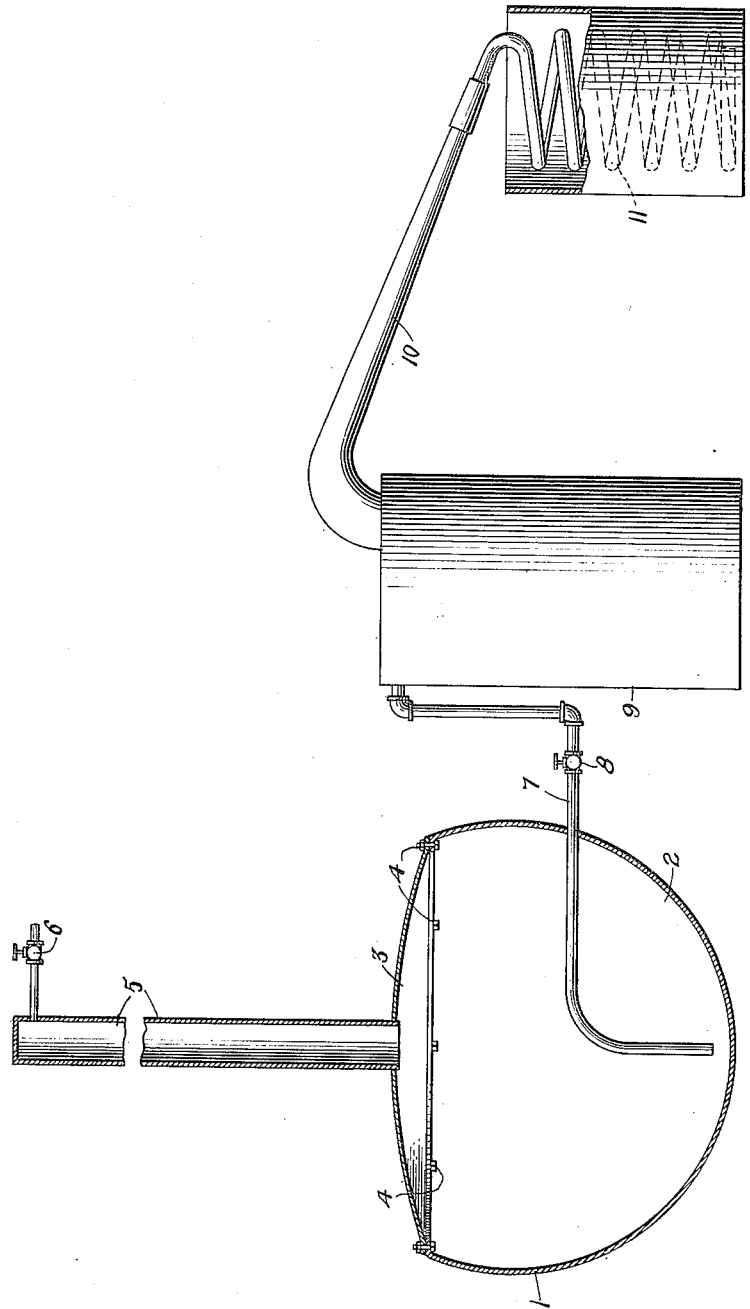

UNITED STATES PATENT OFFICE.

ARTHUR P. TANBERG, OF WILMINGTON, DELAWARE, ASSIGNOR TO E. I. DU PONT DE NEMOURS AND COMPANY, OF WILMINGTON, DELAWARE, A CORPORATION OF DELAWARE.

METHOD OF MANUFACTURING DIPHENYLAMINE.

1,422,494.  Specification of Letters Patent.  Patented July 11, 1922.

Application filed May 31, 1917. Serial No. 172,054.

*To all whom it may concern:*

Be it known that I, ARTHUR P. TANBERG, of Wilmington, in the county of New Castle, and in the State of Delaware, have invented a certain new and useful Improvement in Methods of Manufacturing Diphenylamine, and do hereby declare that the following is a full, clear, and exact description thereof.

My invention relates particularly to a process of producing diphenylamine by the action of a catalyst upon aniline, and similar reactions.

The object of my invention is to provide a process for producing diphenylamine by the treatment of aniline with chlorine or a chloride.

The object of my invention is to insure the production of the diphenylamine by controlling the conditions of the process, particularly the presence of water.

While my invention is capable of being carried out in many different ways, for the purpose of illustration, I shall describe only certain ways of carrying out the same, and while my invention is capable of being carried out in connection with many different forms of apparatus, I will describe only one form of apparatus to be used in connection with carrying out my invention, in the accompanying drawings, in which, The figure is a vertical section of an apparatus which may be used in connection with my invention.

In the drawings I have shown an autoclave 1, comprising a container 2, which may be made of iron, to which there is adapted to be attached a lid 3, which may also be made of iron and which may be attached to the container 2 by means of bolts 4. On the lid 3 there is, furthermore, provided a column 5, having a valved outlet pipe 6, at its upper end. The autoclave may have an outlet pipe 7 having a hand valve 8 leading to a still 9 of any suitable character, having a vapor outlet pipe 10 leading to a condenser 11.

I may for example carry out my invention as follows:

A quantity of aniline mixed with a small percentage of a catalyst, as, for example, hydrogen chloride, the catalyst, however, preferably being about 1% of the aniline, is inserted in the autoclave 1 and the cover 3 tightly secured to the same. Heat is now applied to the autoclave and the contents are subjected to heat and pressure in this manner for any suitable length of time, but preferably 48 hours. The aniline becomes transformed into diphenylamine, in accordance with the following equation:

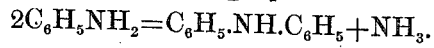

$$2C_6H_5NH_2 = C_6H_5.NH.C_6H_5 + NH_3.$$

By providing the column 5 and the valved outlet pipe 6, I am enabled to release by means of said pipe 6 the ammonia, which accumulates from time to time without losing the aniline, as the column 5 has the effect of condensing the aniline and returning the same to the container 2 under the cooling effect of the air, while the ammonia accumulates in the top of the column 5. In this way the reaction may be carried more nearly to completion, owing to the fact that the ammonia produced in the process is removed from the presence of the aniline.

The process heretofore commonly used in making diphenylamine comprised treating one molecular proportion of aniline with one molecular proportion of aniline hydrochloride; one atomic proportion of chlorine being present for each molecular proportion of free aniline. In my process the purpose of employing a substance containing chlorine is to bring about the formation of diphenylamine catalytically; a stoichiometric proportion (combining weight) of chlorine (preferably in the form of a chloride), based upon the ammonia formed from one half of the aniline, would be one half of one atomic proportion of chlorine for each molecular proportion of aniline originally present; I therefore use less than this stoichiometric proportion. In other words the proportion of chlorine-containing substance employed in the present process is such as to enable said substance to function only as a catalyzer.

With the percentages of the chlorine-containing catalyst less than 0.5%, the reaction takes place very slowly, and, therefore, requires heating for a long period of time, thus increasing the cost of operation. With amounts of the catalyst greater than 3% the ratio of condensation is increased to some extent, but this is offset by the greater loss of material, due to the increased formation of tar.

I have found, furthermore, that the temperature used should be about 300° C., although temperatures from 275 to 325° C. may be used, as at lower temperatures the rate of formation is very slow and at higher temperatures the formation of tar is increased.

The catalyst used may be chlorine, but preferably instead of chlorine I use a compound containing chlorine, as for example, chlorobenzol, ferrous chloride, ammonium chloride, etc.

I have found, furthermore, that in carrying out the process it is practically essential that a small amount of water be present, preferably about 1% of water, but the best results are obtained by an amount of water of not less than .75% and not more than 2% as an amount of water above this percentage is objectionable owing to the increased pressure although it is not disadvantageous chemically. I have found that the condensation from aniline to diphenylamine could not take place in the absence of water or other substances capable of producing water under the conditions described herein. After the mixture has been digested in the autoclave 1, it is blown out through the pipe 7 into the still 9, and there distilled, three fractions being collected. The first fraction, which distills up to 200° C. consists mainly of unchanged aniline, together with a small amount of diphenylamine and is stored for re-digestion with a fresh amount of catalyst. The second fraction, distilling between 200 and 300° C. consists of a mixture of aniline with a larger amount of diphenylamine. The larger part of the latter may be recovered from this fraction by re-distillation. The main body of the diphenylamine is collected in the fraction which distills over and above 300° C. A tarry residue is left in the still from which the catalyst can be recovered.

While I have described my invention above in detail, I wish it to be understood that many changes may be made therein, without departing from the spirit of my invention.

I claim:

1. The process which comprises condensing aniline to diphenylamine by the presence of a substance containing chlorine, the proportion of chlorine-containing substance being such as to enable it to function only as a catalyzer.

2. The process which comprises condensing aniline to diphenylamine by the presence of a chloride, the proportion of chloride being such as to enable it to function only as a catalyzer.

3. The process which comprises condensing aniline to diphenylamine by the presence of hydrogen chloride, the proportion of chloride being such as to enable it to function only as a catalyzer.

4. The process which comprises condensing aniline to diphenylamine by heating the aniline in the presence of a substance containing chlorine, the proportion of chlorine-containing substance being such as to enable it to function only as a catalyzer.

5. The process which comprises condensing aniline to diphenylamine by heating the aniline in the presence of a chloride, the proportion of chloride being such as to enable it to function only as a catalyzer.

6. The process which comprises condensing aniline to diphenylamine by heating the aniline in the presence of hydrogen chloride, the proportion of chloride being such as to enable it to function only as a catalyzer.

7. The process of condensing aniline to diphenylamine which comprises heating aniline under pressure in the presence of a substance containing chlorine, the proportion of chlorine-containing substance being such as to enable it to function only as a catalyzer, and permitting the escape during the reaction of the ammonia split off by the reaction of two molecules of aniline to form the molecule of diphenylamine.

8. The process of condensing aniline to diphenylamine which comprises heating aniline under pressure in the presence of a chloride, the proportion of chloride being such as to enable it to function only as a catalyzer, and permitting the escape during the reaction of the ammonia split off by the reaction of two molecules of aniline to form a molecule of diphenylamine.

9. The process of condensing aniline to diphenylamine which comprises heating aniline under pressure in the presence of hydrogen chloride, the proportion of hydrogen chloride being such as to enable it to function only as a catalyzer, and permitting the escape during the reaction of the ammonia split off by the reaction of two molecules of aniline to form the molecule of diphenylamine.

10. The process which comprises condensing aniline to diphenylamine by means of a substance containing chlorine in the presence of water, the proportion of chlorine-containing substance being such as to enable it to function only as a catalyzer.

11. The process which comprises condensing aniline to diphenylamine by means of a substance containing chlorine in the presence of not more than 2% of water.

12. The process which comprises condensing aniline to diphenylamine by means of a chloride in the presence of water, the proportion of chloride being such as to enable it to function only as a catalyzer.

13. The process which comprises condensing aniline to diphenylamine by means of a chloride in the presence of not more than 2% of water.

14. The process which comprises condensing aniline to diphenylamine by means of hydrogen chloride in the presence of water, the proportion of chloride being such as to enable it to function only as a catalyzer.

15. The process which comprises condensing aniline to diphenylamine by means of from about 0.5% to 3% of hydrogen chloride in the presence of not more than 2% of water.

16. The process of condensing aniline to diphenylamine which comprises heating aniline under pressure in the presence of water and of a chloride, the proportion of chloride being such as to enable it to function only as a catalyzer, and permitting the escape during the reaction of the ammonia split off by the reaction of two molecules of aniline to form a molecule of diphenylamine.

17. The process of condensing aniline to diphenylamine which comprises heating aniline under pressure in the presence of not more than 2% of water and from 0.5% to 3% of a chloride, and permitting the escape of ammonia during the reaction.

18. The process of condensing aniline to diphenylamine which comprises heating aniline under pressure in the presence of water and of hydrogen chloride, the proportion of hydrogen chloride being such as to enable it to function only as a catalyzer, and permitting the escape during the reaction of the ammonia split off by the reaction of two molecules of aniline to form the molecule of diphenylamine.

19. The process of condensing aniline to diphenylamine which comprises heating aniline under pressure in the presence of not more than 2% of water and of from 0.5% to 3% of hydrogen chloride, and permitting the escape of ammonia during the reaction.

In testimony that I claim the foregoing I have hereunto set my hand.

ARTHUR P. TANBERG.

Witnesses:
G. D. HOPKINS,
R. B. SEGAR.